US012781836B1

(12) United States Patent
Ledesma et al.

(10) Patent No.: US 12,781,836 B1
(45) Date of Patent: Nov. 3, 2026

(54) EXTERNAL RECIRCULATION ASSEMBLY FOR A BALL SCREW ASSEMBLY

(71) Applicant: Schaeffler Technologies AG & Co. KG, Herzogenaurach (DE)

(72) Inventors: Diego Alejandro Ledesma, Irapuato (MX); Renato de Paula, Sterling Heights, MI (US); Emily Bygrave, Madison Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/209,156

(22) Filed: May 15, 2025

(51) Int. Cl.
*F16H 25/20* (2006.01)
*F16H 25/22* (2006.01)

(52) U.S. Cl.
CPC ................................ *F16H 25/2214* (2013.01)

(58) Field of Classification Search
CPC ............. F16H 25/2214; F16H 25/2219; F16H 25/2223; F16H 25/2204
See application file for complete search history.

(56) References Cited

U.S. PATENT DOCUMENTS 4,211,125 A * 7/1980 Benton ............... F16H 25/2219 74/424.82
4,221,137 A * 9/1980 Futaba ................ F16H 25/2209 74/424.82
6,425,302 B2 7/2002 Greubel
8,857,283 B2 * 10/2014 Kiforiuk ............. F16H 25/2214 74/424.82
8,863,601 B2 * 10/2014 Chen ................... F16H 25/2219 74/424.82
2001/0025540 A1 10/2001 Greubel
2003/0172759 A1 * 9/2003 Hayashi .............. F16H 25/2214 74/424.86
2004/0154421 A1 * 8/2004 Pfister ................. F16H 25/2223 74/424.82
2005/0252320 A1 11/2005 Hartig et al.
2005/0252321 A1 * 11/2005 Hartig .................. B62D 5/0448 74/424.82
2006/0070472 A1 * 4/2006 Hayashi .............. F16H 25/2214 74/424.82
2006/0101934 A1 * 5/2006 Osterlaenger ....... F16H 25/2214 74/424.82
2014/0352470 A1 * 12/2014 Hsieh .................. F16H 25/2418 74/424.82

(Continued)

FOREIGN PATENT DOCUMENTS

EP 1490609 B1 5/2006
WO WO-03006848 A1 * 1/2003 ......... F16H 25/2214

(Continued)

*Primary Examiner* — Zakaria Elahmadi
(74) *Attorney, Agent, or Firm* — Price Heneveld LLP

(57) ABSTRACT

An external recirculation assembly for a ball screw assembly includes a first body that includes a first body channel, a second body that includes a second body channel, and an intermediate body that includes a first intermediate body channel and a second intermediate body channel, wherein the intermediate body is positioned between the first body and the second body, such that the first body channel and the first intermediate body channel cooperate to define a first recirculation path, and the second body channel and the second intermediate body channel cooperate to define a second recirculation path.

19 Claims, 5 Drawing Sheets

(56) References Cited

U.S. PATENT DOCUMENTS

2015/0053036 A1* 2/2015 Chen .................. F16H 25/2228
74/424.82

FOREIGN PATENT DOCUMENTS

WO 2010094706 A1 8/2010
WO WO-2012119847 A1 * 9/2012 ......... F16H 25/2214
WO 2019015710 A1 1/2019

* cited by examiner

EXTERNAL RECIRCULATION ASSEMBLY FOR A BALL SCREW ASSEMBLY

FIELD OF THE DISCLOSURE

The present disclosure generally relates to a ball screw assembly that utilizes an external recirculation assembly. More specifically, the present disclosure is related to a ball screw assembly that utilizes an external recirculation assembly comprising a first body, a second body, and an intermediate body positioned therebetween.

BACKGROUND OF THE DISCLOSURE

Ball screw assemblies can include an external recirculation system for recirculating rollers within the ball screw assembly.

SUMMARY OF THE DISCLOSURE

According to a first aspect of the present disclosure, a ball screw assembly includes a ball screw operable to rotate about an axis and having a helical groove that extends along an outer surface of the ball screw. A ball nut includes a corresponding helical groove and is disposed about the ball screw, such that the helical groove of the ball screw and the corresponding helical groove of the ball nut cooperate to define a helical raceway between the ball screw and the ball nut. An external recirculation assembly coupled to the ball nut includes a first body that includes a first body channel, a second body that includes a second body channel, and an intermediate body that includes a first intermediate body channel and a second intermediate body channel. The intermediate body is positioned between the first body and the second body, such that the first body channel and the first intermediate body channel cooperate to define a first recirculation path that is in fluid communication with the helical raceway, and the second body channel and the second intermediate body channel cooperate to define a second recirculation path that is in fluid communication with the helical raceway. A first plurality of rollers and a second plurality of rollers are provided wherein rotation of the ball screw about the axis drives circulation of the first plurality of rollers along a first roller path that includes the first recirculation path and the helical raceway, circulation of the second plurality of rollers along a second roller path that includes the second recirculation path and the helical raceway, and axial movement of the ball nut along the ball screw.

Embodiments of the first aspect of the disclosure can include any one or a combination of the following features:

- the first recirculation path includes a first inlet configured to receive the first plurality of rollers into the first recirculation path and a first outlet through which the first plurality of rollers are configured to exit the first recirculation path, and the second recirculation path includes a second inlet configured to receive the second plurality of rollers into the second recirculation path and a second outlet through which the second plurality of rollers are configured to exit the second recirculation path;
- the first inlet is defined by the first body channel and the first intermediate body channel, and the first outlet is defined by the first body channel and the first intermediate body channel;
- the second inlet is defined by the second body channel and the second intermediate body channel, and the second outlet is defined by the second body channel and the second intermediate body channel;
- the first inlet is aligned with the helical groove of the ball screw at a first point along the helical groove, the second outlet is aligned with the helical groove of the ball screw at a second point along the helical groove, and the first point is less than two helical revolutions from the second point along the helical groove;
- the external recirculation assembly extends a first axial distance from a first axial endpoint of the external recirculation assembly formed by the first body to a second axial endpoint of the external recirculation assembly formed by the second body, and the intermediate body extends a second axial distance from a first axial endpoint of the intermediate body to a second axial endpoint of the intermediate body, wherein the first axial endpoint of the external recirculation assembly is the axially-outward most portion of the external recirculation assembly in a first axial direction, the second axial endpoint of the external recirculation assembly is the axially-outward most portion of the external recirculation assembly in a second axial direction opposite the first axial direction, the first axial endpoint of the intermediate body is the axially-outward most portion of the intermediate body in the first axial direction, and the second axial endpoint of the intermediate body is the axially-outward most portion of the intermediate body in the second axial direction, and wherein the second axial distance is greater than 75 percent of the first axial distance;
- the second axial distance is greater than 85 percent of the first axial distance;
- the second axial distance is greater than 90 percent of the first axial distance;
- the external recirculation assembly extends circumferentially about the ball nut from a first circumferential end of the external recirculation assembly to a second circumferential end of the external recirculation assembly less than 270 degrees; and
- the external recirculation assembly extends circumferentially about the ball nut from the first circumferential end of the external recirculation assembly to the second circumferential end of the external recirculation assembly about 180 degrees.

According to a second aspect of the present disclosure, an external recirculation assembly for a ball screw assembly includes a first body that includes a first body channel, a second body that includes a second body channel, and an intermediate body that includes a first intermediate body channel and a second intermediate body channel. The intermediate body is positioned between the first body and the second body, such that the first body channel and the first intermediate body channel cooperate to define a first recirculation path, and the second body channel and the second intermediate body channel cooperate to define a second recirculation path.

Embodiments of the second aspect of the disclosure can include anyone or a combination of the following features:

- the first recirculation path includes a first inlet and a first outlet, and the second recirculation path includes a second inlet and a second outlet, and wherein the first inlet is defined by the first body channel and the first intermediate body channel, and the first outlet is defined by the first body channel and the first intermediate body channel;
- the second inlet is defined by the second body channel and the second intermediate body channel, and the second outlet is defined by the second body channel and the second intermediate body channel;

the external recirculation assembly extends a first axial distance from a first axial endpoint of the external recirculation assembly formed by the first body to a second axial endpoint of the external recirculation assembly formed by the second body, and the intermediate body extends a second axial distance from a first axial endpoint of the intermediate body to a second axial endpoint of the intermediate body, wherein the first axial endpoint of the external recirculation assembly is the axially-outward most portion of the external recirculation assembly in a first axial direction, the second axial endpoint of the external recirculation assembly is the axially-outward most portion of the external recirculation assembly in a second axial direction opposite the first axial direction, the first axial endpoint of the intermediate body is the axially-outward most portion of the intermediate body in the first axial direction, and the second axial endpoint of the intermediate body is the axially-outward most portion of the intermediate body in the second axial direction, and wherein the second axial distance is greater than 75 percent of the first axial distance;

the second axial distance is greater than 85 percent of the first axial distance; and the second axial distance is greater than 90 percent of the first axial distance.

According to a third aspect of the present disclosure, a ball screw assembly includes a ball screw, ball nut that cooperates with the ball screw to define a raceway, and an external recirculation assembly. The external recirculation assembly includes a first body that includes a first body channel, a second body that includes a second body channel, and an intermediate body that includes a first intermediate body channel and a second intermediate body channel, wherein the first body channel and the first intermediate body channel cooperate to define a first recirculation path that is in fluid communication with the raceway, and the second body channel and the second intermediate body channel cooperate to define a second recirculation path that is in fluid communication with the raceway.

Embodiments of the third aspect of the disclosure can include any one or a combination of the following features:

the raceway is helical;

the ball screw is operable to rotate about an axis, and the ball nut is rotationally fixed relative to the axis;

the ball screw assembly includes a first plurality of rollers, and a second plurality of rollers, wherein rotation of the ball screw about the axis drives circulation of the first plurality of rollers along a first roller path that includes the first recirculation path and the raceway, circulation of the second plurality of rollers along a second roller path that includes the second recirculation path and the raceway, and axial movement of the ball nut along the ball screw.

These and other features, advantages, and objects of the present disclosure will be further understood and appreciated by those skilled in the art by reference to the following specification, claims, and appended drawings.

Figure 1:
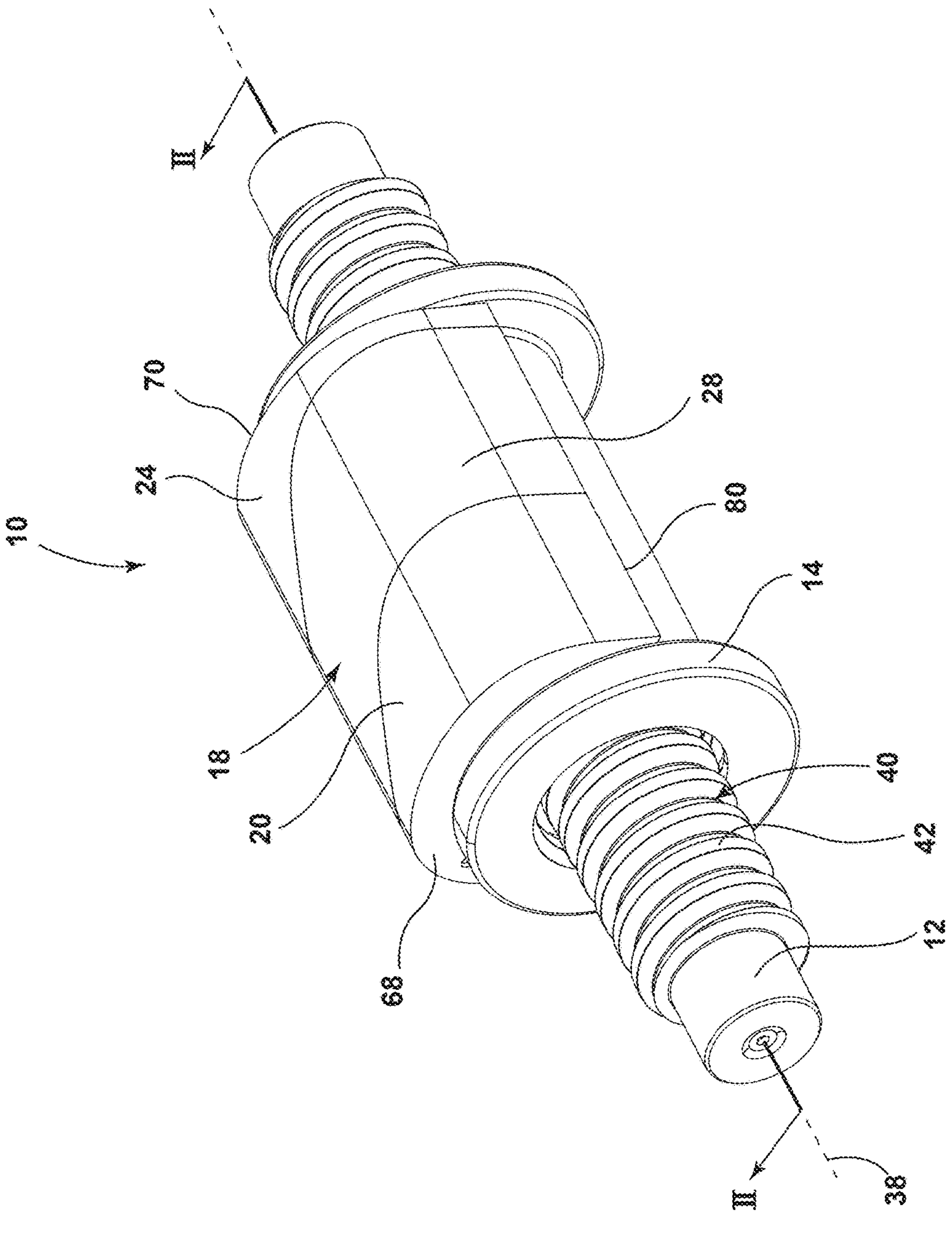
FIG. 1 is a perspective view of a ball screw assembly, illustrating a ball screw, a ball nut, and an external recirculation assembly, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis about which a ball screw is configured to rotate in operation of the apparatus described herein. Further, the term "radial" and derivatives thereof, such as "radially," shall be understood in relation to the aforementioned axis. For example, "radially outboard" refers to further away from the axis, while "radially inboard" refers to nearer to the axis. The term "circumferential" and derivatives thereof, such as "circumferentially," shall be understood in relation to the aforementioned axis.

Referring now to FIGS. 1-6, a ball screw assembly 10 includes a ball screw 12 and a ball nut 14 that cooperates with the ball screw 12 to define a raceway 16. The ball screw assembly 10 further includes an external recirculation assembly 18. The external recirculation assembly 18 includes a first body 20 that includes a first body channel 22, a second body 24 that includes a second body channel 26, and an intermediate body 28 that includes a first intermediate body channel 30 and a second intermediate body channel 32. The first body channel 22 and the first intermediate body channel 30 cooperate to define a first recirculation path 34 that is in fluid communication with the raceway 16. The second body channel 26 and the second intermediate body channel 32 cooperate to define a second recirculation path 36 that is in fluid communication with the raceway 16.

Figure 2:
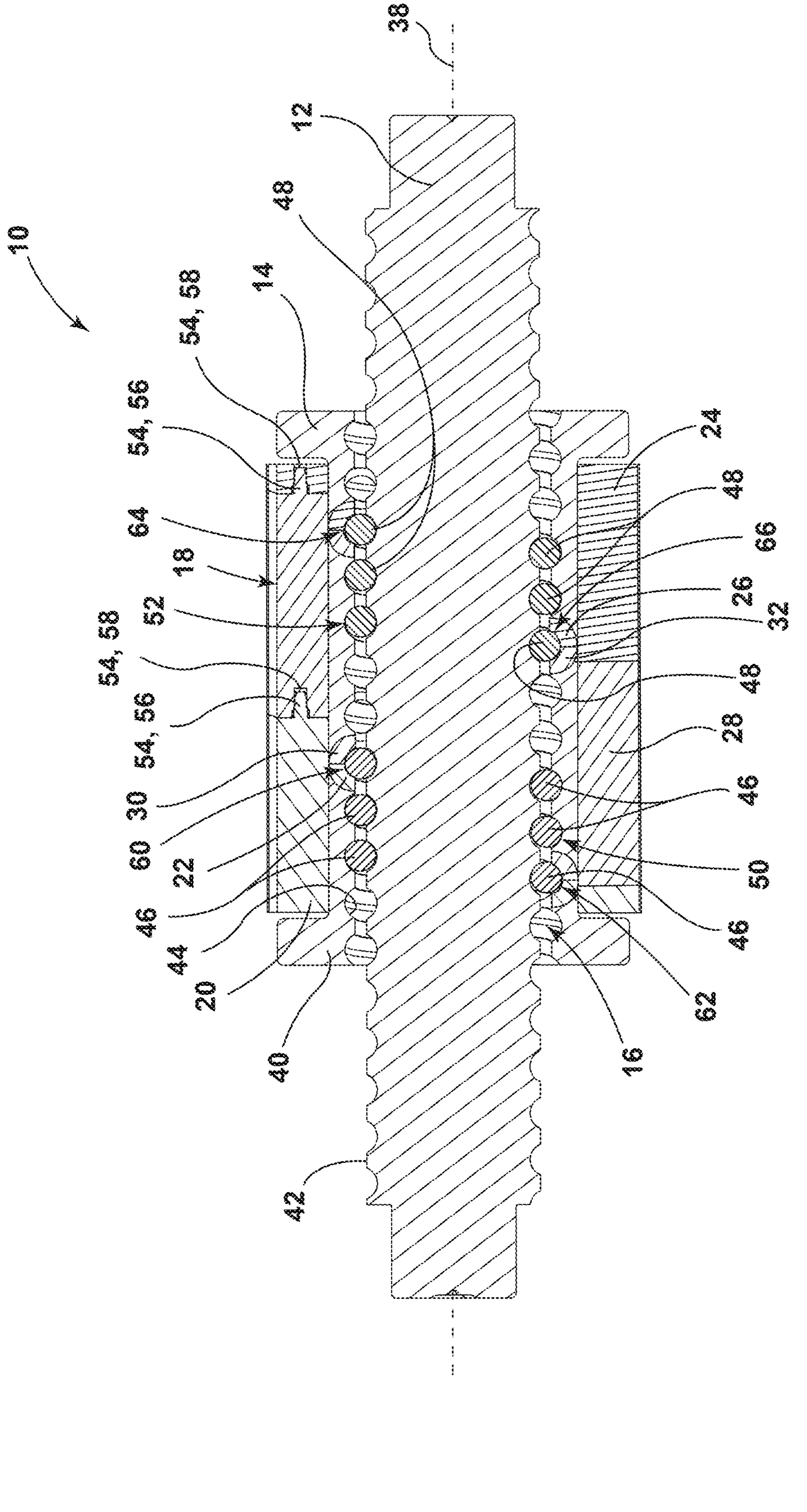
FIG. 2 is a cross-sectional view of the ball screw assembly of FIG. 1 taken at line II-II, illustrating a first plurality of rollers within a first roller path of the ball screw assembly, and a second plurality of rollers within a second roller path of the ball screw assembly, according to one embodiment.

Referring now to FIGS. 1 and 2, the ball screw assembly 10 includes the ball screw 12. The ball screw 12 is operable to rotate about an axis 38 in operation of the ball screw assembly 10. The ball screw 12 includes a groove 40 that extends along an outer surface 42 of the ball screw 12. In various embodiments, the groove 40 is a helical groove 40 that extends along the outer surface 42 of the ball screw 12, as illustrated exemplarily in FIGS. 1 and 2.

As illustrated in FIGS. 1 and 2, the ball screw assembly 10 includes the ball nut 14. The ball nut 14 includes a corresponding groove 44 that cooperates with the groove 40 of the ball screw 12 to define the raceway 16 between the ball screw 12 and the ball nut 14. In the embodiment illustrated in FIG. 2, the corresponding groove 44 of the ball nut 14 is a corresponding helical groove 44, and the ball nut 14 is disposed about the ball screw 12, such that the helical groove 40 of the ball screw 12 and the corresponding helical groove 44 of the ball nut 14 cooperate to define a helical raceway 16 between the ball screw 12 and the ball nut 14.

As illustrated in FIG. 2, the ball screw assembly 10 can include a first plurality of rollers 46 and a second plurality of rollers 48. In various implementations, the rollers of the first and second pluralities of rollers 46, 48 are ball-shaped rollers, as illustrated in FIG. 2. In operation of the ball screw assembly 10, rotation of the ball screw 12 drives circulation of the first plurality of rollers 46 along a first roller path 50 that includes the first recirculation path 34 and the raceway 16 that is in fluid communication with the first recirculation path 34. Further, rotation of the ball screw 12 about the axis 38 drives circulation of the second plurality of rollers 48 along a second roller path 52 that includes the second recirculation path 36 and the raceway 16 that is in fluid communication with the second recirculation path 36. In various implementations, rotation of the ball screw 12 about the axis 38 drives circulation of the first plurality of rollers 46 and the second plurality of rollers 48, as well as axial movement of the ball nut 14 along the ball screw 12. In various embodiments, the ball nut 14 is rotationally fixed relative to the axis 38. As such, rotation of the ball screw 12 in operation of the ball screw assembly 10 may drive axial translation of the ball nut 14, in various implementations.

Figure 3:
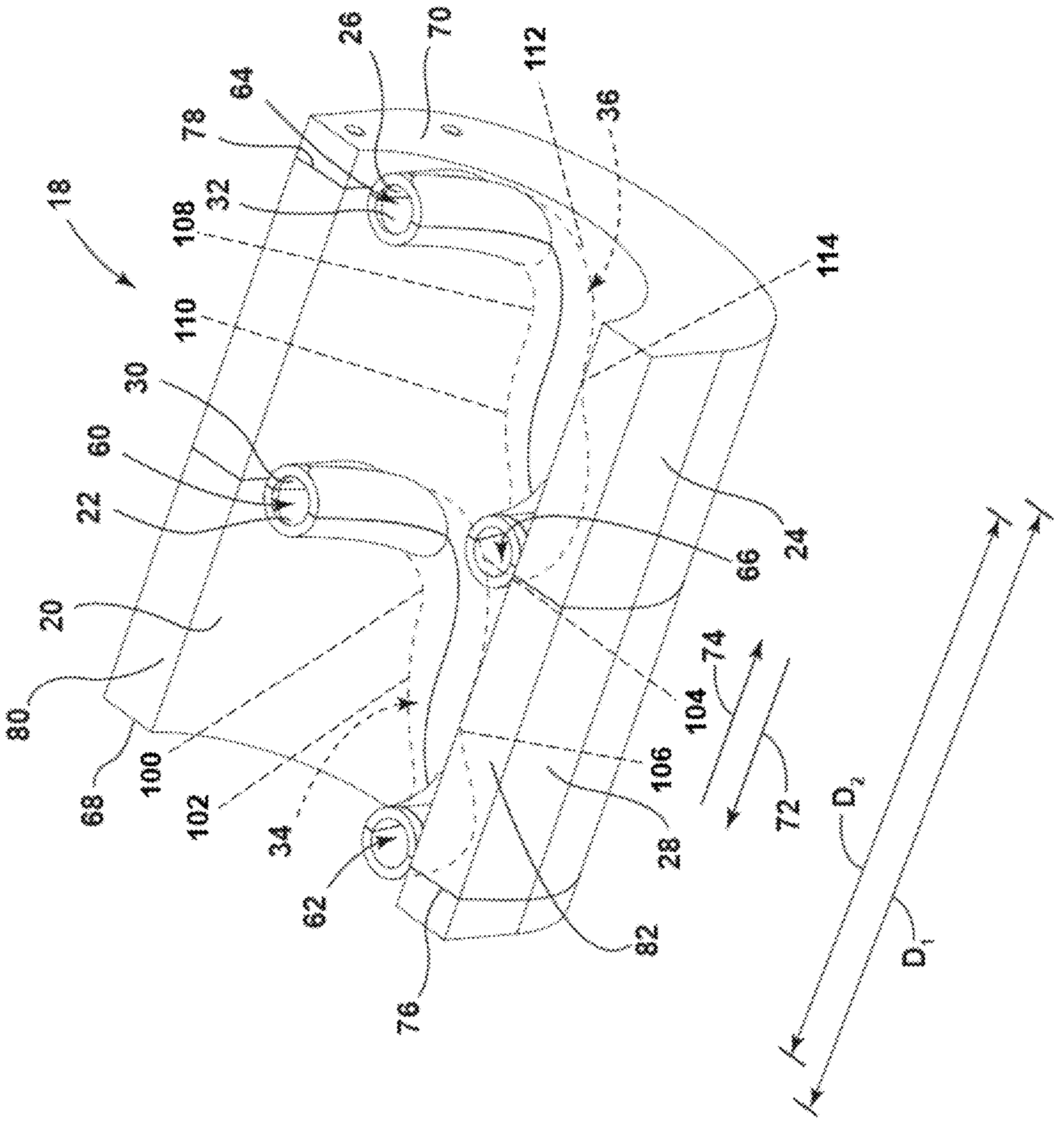
FIG. 3 is a perspective view of an external recirculation assembly of a ball screw assembly, illustrating a first body, a second body, and an intermediate body positioned axially between the first and second bodies, wherein the first body cooperates with the intermediate body to define a first recirculation path, and the second body cooperates with the intermediate body to define a second recirculation path, according to one embodiment.
Figure 4:
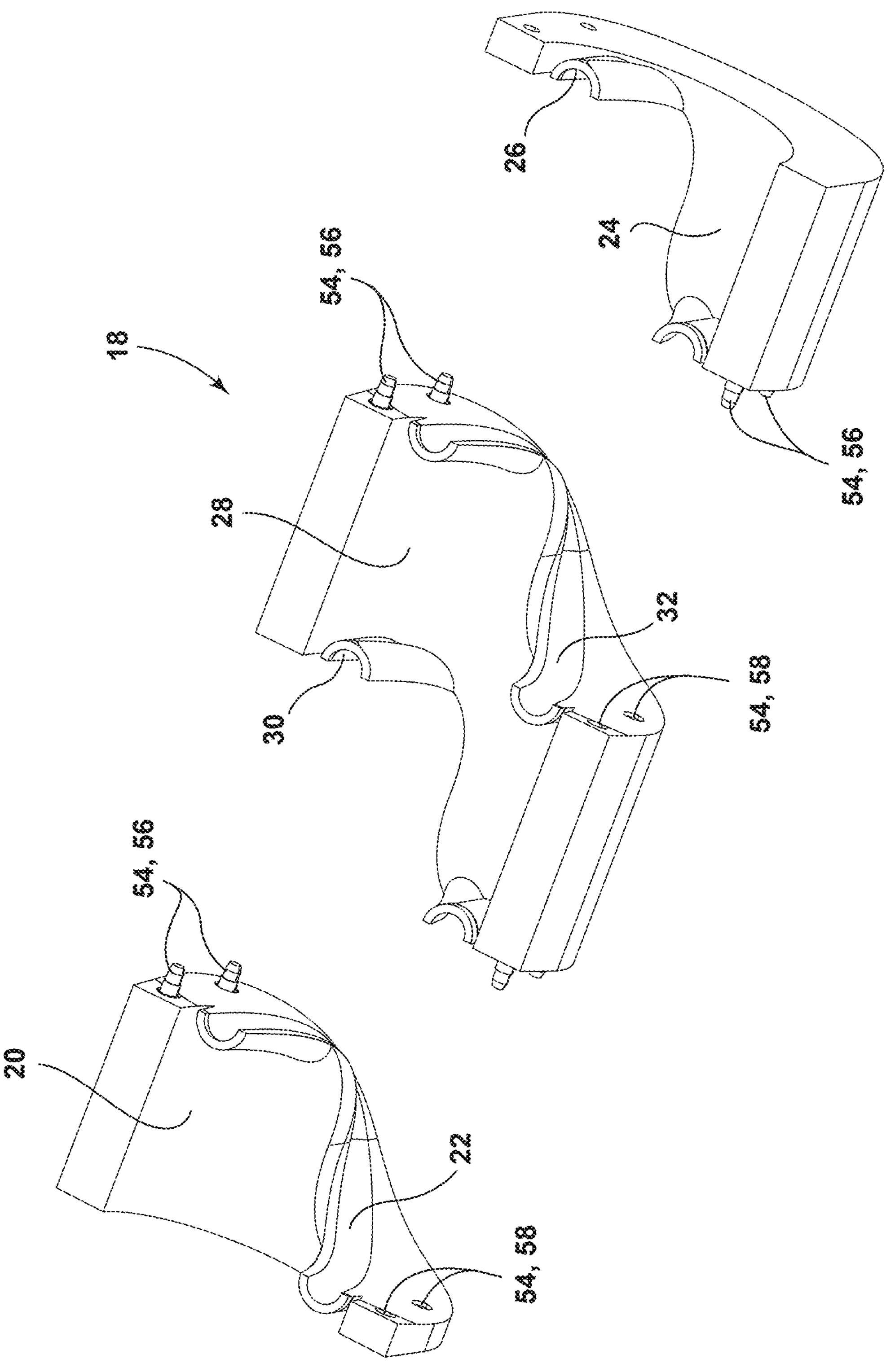
FIG. 4 is an exploded view of the external recirculation assembly of FIG. 3, illustrating a first body channel of the first body, first and second intermediate body channels of the intermediate body, and a second body channel of the second body, according to one embodiment.
Figure 6:
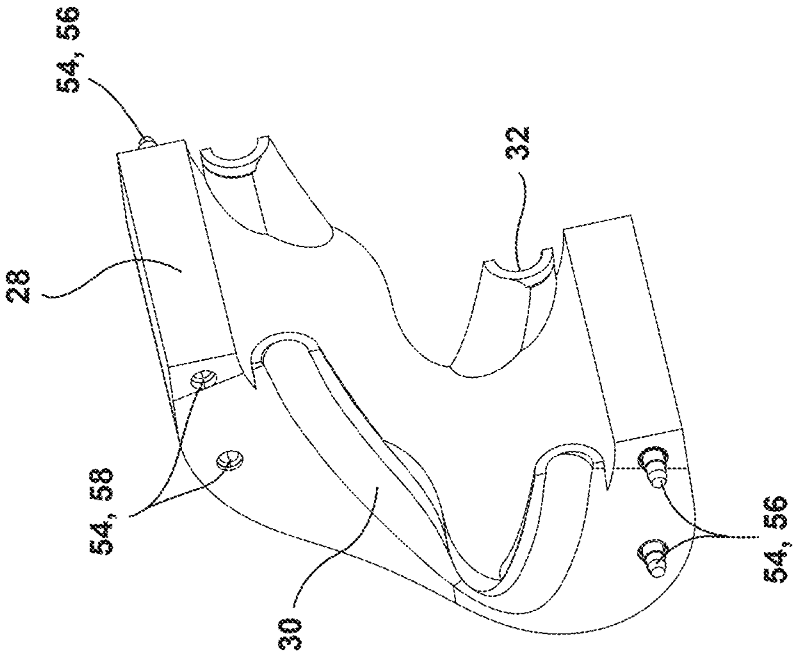
FIG. 6 is a perspective view of the intermediate body of the external recirculation assembly, according to one embodiment.
Figure 5:
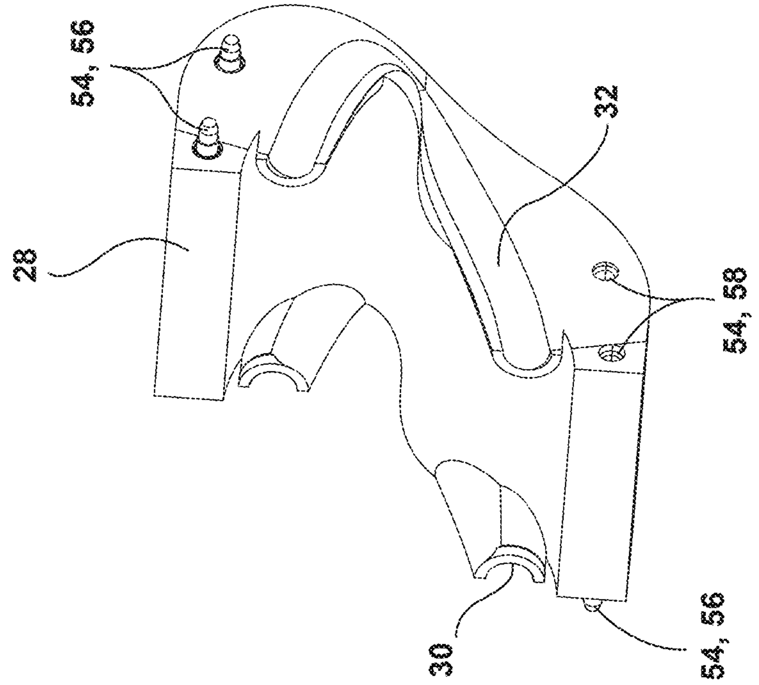
FIG. 5 is a perspective view of an intermediate body of an external recirculation assembly.

Referring now to FIGS. 1-6, the external recirculation assembly 18 of the ball screw assembly 10 includes the first body 20, the second body 24, and the intermediate body 28. As illustrated in FIGS. 1-4, the intermediate body 28 is positioned between the first body 20 and the second body 24. In various implementations, the intermediate body 28 is positioned axially between the first and second bodies 20, 24. As illustrated in FIG. 4, the first body 20, the second body 24, and the intermediate body 28 are distinct components. In some embodiments, the first body 20, the second body 24, and the intermediate body 28 may each be a single unitary component. For example, the first body 20 may be a first injection-molded plastic component, the second body 24 may be a second injection-molded plastic component, and the intermediate body 28 may be a third injection-molded plastic component.

In various implementations, the first and second bodies 20, 24 and the intermediate body 28 include corresponding connectors 54 that connect the first and second bodies 20, 24 to the intermediate body 28. In the embodiment illustrated in FIG. 4, the corresponding connectors 54 include male protrusions 56 and female receivers 58 disposed on each of the first body 20, the second body 24, and the intermediate body 28. In the illustrated embodiment, the first and second bodies 20, 24 are assembled to the intermediate body 28 via alignment of the corresponding male protrusions 56 and female receivers 58 followed by the application of an axially compressive force on the axial ends of the external recirculation assembly 18. It is contemplated that the first, second, and/or intermediate bodies 20, 24, 28 may include a variety of types of corresponding connectors 54 and may be assembled to each other in a variety of manners, in various embodiments.

Referring now to FIGS. 3-6, the first body 20 of the external recirculation assembly 18 includes the first body channel 22, the second body 24 includes the second body channel 26, and the intermediate body 28 includes the first intermediate body channel 30 and the second intermediate body channel 32. As illustrated in FIG. 3, the first body channel 22 and the first intermediate body channel 30 cooperate to define the first recirculation path 34. Further, the second body channel 26 and the second intermediate body channel 32 cooperate to define the second recirculation path 36. In various embodiments, the first body channel 22 and the first intermediate body channel 30 cooperate to define the first recirculation path 34 via abutment of corresponding portions of the first body 20 and the intermediate body 28 that are adjacent the first body channel 22 and the first intermediate body channel 30, respectively. Likewise, the second body channel 26 and the second intermediate body channel 32 may cooperate to define the second recirculation path 36 via abutment of corresponding portions of the second body 24 and the intermediate body 28 that are adjacent to the second body channel 26 and the second intermediate body channel 32, respectively. This abutment of corresponding portions of the first and second bodies 20, 24 and the intermediate body 28 results in the first and second body channels 22, 26 being arranged relative to the first and second intermediate body channels 30, 32, respectively, to generally form conduits. For example, as illustrated in FIG. 3, the first body channel 22 and the first intermediate body channel 30 are arranged to form a conduit that defines the first recirculation path 34. Further, the second body channel 26 and the second intermediate body channel 32 are arranged to form a conduit that defines the second recirculation path 36. As illustrated in FIG. 4, in various embodiments, the corresponding connectors 54 of the first body 20, the second body 24, and the intermediate body 28 are configured to retain the corresponding portions of the bodies 20, 24, 28 in abutment in the assembled condition of the external recirculation assembly 18.

As illustrated in FIG. 3, the first recirculation path 34 includes a first inlet 60 and a first outlet 62. The first inlet 60 is configured to receive the first plurality of rollers 46 into the first recirculation path 34, and the first plurality of rollers 46 are configured to exit the first recirculation path 34 via the first outlet 62 in operation of the ball screw assembly 10. The second recirculation path 36 may include a second inlet 64 and a second outlet 66, as illustrated exemplarily in FIG. 3. The second inlet 64 may be configured to receive the second plurality of rollers 48 into the second recirculation path 36, and the second plurality of rollers 48 may be configured to exit the second recirculation path 36 through the second outlet 66 in operation of the ball screw assembly 10. In some embodiments, the first inlet 60 of the first recirculation path 34 may be defined by the first body channel 22 and the first intermediate body channel 30, and the first outlet 62 may be defined by the first body channel 22 and the first intermediate body channel 30. In some embodiments, the second inlet 64 of the second recirculation path 36 may be defined by the second body channel 26 and the second intermediate body channel 32, and the second outlet 66 of the second recirculation path 36 may be defined by the second body channel 26 and the second intermediate body channel 32.

Referring now to FIGS. 3-6, in some embodiments, the first body channel 22 may extend from the first inlet 60 of the first recirculation path 34 to the first outlet 62 of the first recirculation path 34 along a length of the first body channel 22. The first intermediate body channel 30 may extend from the first inlet 60 to the first outlet 62 along a length of the first intermediate body channel 30. The second body channel 26 may extend from the second inlet 64 of the second recirculation path 36 to the second outlet 66 of the second recirculation path 36 along a length of the second body channel 26. The second intermediate body channel 32 may extend from the second inlet 64 to the second outlet 66 along a length of the second intermediate body channel 32.

The length of the first body channel 22 includes a convex portion 100 and a concave portion 102. As illustrated in FIG. 3, the convex portion 100 of the length of the first body channel 22 is nearer than the concave portion 102 of the length of the first body channel 22 to the first inlet 60 of the first recirculation path 34. The length of the first intermediate body channel 30 includes a concave portion 104 and a convex portion 106. As illustrated in FIG. 3, the concave portion 104 of the length of the first intermediate body channel 30 is nearer than the convex portion 106 of the length of the first intermediate body channel 30 to the first inlet 60 of the first recirculation path 34. In the illustrated embodiment, the convex portion 100 of the length of the first body channel 22 opposes the concave portion 104 of the length of the first intermediate body channel 30, and the concave portion 102 of the length of the first body channel 22 opposes the convex portion 106 of the length of the first intermediate body channel 30.

Referring still to FIG. 3, the length of the second intermediate body channel 32 includes a convex portion 108 and a concave portion 110, wherein the convex portion 108 is nearer than the convex portion 110 to the second inlet 64 of the second recirculation path 36. Further, the length of the second body channel 26 includes a concave portion 112 and a convex portion 114, wherein the concave portion 112 is nearer than the convex portion 114 to the second inlet 64 of the second recirculation path 36. As illustrated in FIG. 3, the convex portion 108 of the length of the second intermediate body channel 32 opposes the concave portion 112 of the length of the second body channel 26. Further, the concave portion 110 of the length of the second intermediate body channel 32 opposes the convex portion 114 of the length of the second body channel 26. In this way, the curvatures of the lengths of first and second body channels 22, 26 and the first and second intermediate body channels 30, 32 may result in the first and second body channels 22, 26 and the first and second intermediate body channels 30, 32 cooperating to define serpentine first and second recirculation paths 34, 36.

Referring now to FIG. 2, in various embodiments, the first recirculation path 34 is axially offset from the second recirculation path 36. In the embodiment illustrated in FIG. 2, the first inlet 60 is aligned with the helical groove 40 of the ball screw 12 at a first point along the helical groove 40. Further, the second outlet 64 of the second recirculation path 36 is aligned with the helical groove 40 of the ball screw 12 at a second point along the helical groove 40. In various embodiments, the first point may be less than two helical revolutions from the second point along the helical groove 40.

Referring now to FIG. 3, the external recirculation assembly 18 extends a first axial distance $D_1$ from a first axial endpoint 68 of the external recirculation assembly 18 to a second axial endpoint 70 of the external recirculation assembly 18. The first axial endpoint 68 of the external recirculation assembly 18 is formed by the first body 20 of the external recirculation assembly 18 and is the axially-outward most portion of the external recirculation assembly 18 in a first axial direction 72. The second axial endpoint 78 of the external recirculation assembly 18 is formed by the second body 24 of the external recirculation assembly 18 and is the axially-outward most portion of the external recirculation assembly 18 in a second axial direction 74 that is opposite the first axial direction 72. The intermediate body 28 extends a second axial distance $D_2$ from a first axial endpoint 76 of the intermediate body 28 to a second axial endpoint 78 of the intermediate body 28. The first axial endpoint 76 of the intermediate body 28 is the axially-outward most portion of the intermediate body 28 in the first axial direction 72 and the second axial endpoint 78 of the intermediate body 28 is the axially-outward most portion of the external recirculation assembly 18 in the second axial direction 74.

As illustrated in FIG. 3, the first axial distance $D_1$ is greater than the second axial distance $D_2$. In some embodiments, the second axial distance $D_2$ is greater than 75 percent of the first axial distance $D_1$. In some embodiments, the second axial distance $D_2$ is greater than 85 percent of the first axial distance $D_1$. In some embodiments, the second axial distance $D_2$ is greater than 90 percent of the first axial distance $D_1$.

Referring now to FIGS. 1-3, the external recirculation assembly 18 includes a first circumferential end 80 and a second circumferential end 82. As illustrated in FIGS. 1 and 3, the external recirculation assembly 18 extends circumferentially about the ball nut 14 from the first circumferential end 80 to the second circumferential end 82 of the external recirculation assembly 18. In various implementations, the external recirculation assembly 18 may extend circumferentially about the ball nut 14 from the first circumferential end 80 of the external recirculation assembly 18 to the second circumferential end 82 of the external recirculation assembly 18 less than 270°. In some embodiments, the external recirculation assembly 18 extends circumferentially about the ball nut 14 from the first circumferential end 80 of the external recirculation assembly 18 to the second circumferential end 82 of the external recirculation assembly 18 about 180°.

The ball screw assembly 10 and the external recirculation assembly 18 of the present disclosure may provide a variety of advantages. For example, the first intermediate body channel 30 cooperating with the first body channel 22 of the first body 20 to define the first recirculation path 34 and the second intermediate body channel 32 cooperating with the second body channel 26 of the second body 24 to define the second recirculation path 36 may advantageously provide for the first and second recirculation paths 34, 36 in an axially space-saving footprint. Further, utilizing the intermediate body 28 to define portions of the first and second recirculation paths 34, 36 may allow for a small axial footprint as well as a small circumferential footprint of the external recirculation assembly 18.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 ball screw assembly
12 ball screw
14 ball nut
16 raceway
18 external recirculation assembly
20 first body
22 first body channel
24 second body
26 second body channel
28 intermediate body
30 first intermediate body channel
32 second intermediate body channel
34 first recirculation path
36 second recirculation path
38 axis
40 groove
42 outer surface
44 corresponding groove
46 first plurality of rollers
48 second plurality of rollers
50 first roller path
52 second roller path
54 connectors
56 male protrusion
58 female receiver
60 first inlet
62 first outlet
64 second inlet
66 second outlet
68 first axial endpoint
70 second axial endpoint
72 first axial direction
74 second axial direction
76 first axial endpoint
78 second axial endpoint
80 first circumferential end
82 second circumferential end
100 convex portion (of the length of the first body channel)
102 concave portion (of the length of the first body channel)
104 concave portion (of the length of the first intermediate body channel)
106 convex portion (of the length of the first intermediate body channel)
108 convex portion (of the length of the second intermediate body channel)
110 concave portion (of the length of the second intermediate body channel)
112 concave portion (of the length of the second body channel)
114 convex portion (of the length of the second body channel)
$D_1$ first axial distance
$D_2$ second axial distance

What is claimed is:

1. A ball screw assembly, comprising:

a ball screw operable to rotate about an axis and having a helical groove that extends along an outer surface of the ball screw;

a ball nut having a corresponding helical groove and being disposed about the ball screw, such that the helical groove of the ball screw and the corresponding helical groove of the ball nut cooperate to define a helical raceway between the ball screw and the ball nut;

an external recirculation assembly coupled to the ball nut, comprising:

a first body that includes a first body channel;

a second body that includes a second body channel; and an intermediate body that includes a first intermediate body channel and a second intermediate body channel, wherein the intermediate body is positioned between the first body and the second body, such that the first body channel and the first intermediate body channel cooperate to define a first recirculation path that is in fluid communication with the helical raceway, and the second body channel and the second intermediate body channel cooperate to define a second recirculation path that is in fluid communication with the helical raceway, wherein the external recirculation assembly extends a first axial distance from a first axial endpoint of the external recirculation assembly formed by the first body to a second axial endpoint of the external recirculation assembly formed by the second body, and the intermediate body extends a second axial distance from a first axial endpoint of the intermediate body to a second axial endpoint of the intermediate body, wherein the first axial endpoint of the external recirculation assembly is the axially-outward most portion of the external recirculation assembly in a first axial direction, the second axial endpoint of the external recirculation assembly is the axially-outward most portion of the external recirculation assembly in a second axial direction opposite the first axial direction, the first axial endpoint of the intermediate body is the axially-outward most portion of the intermediate body in the first axial direction, and the second axial endpoint of the intermediate body is the axially-outward most portion of the intermediate body in the second axial direction, and wherein the second axial distance is greater than 75 percent of the first axial distance;

a first plurality of rollers; and a second plurality of rollers, wherein rotation of the ball screw about the axis drives circulation of the first plurality of rollers along a first roller path that includes the first recirculation path and the helical raceway, circulation of the second plurality of rollers along a second roller path that includes the second recirculation path and the helical raceway, and axial movement of the ball nut along the ball screw.

2. The ball screw assembly of claim 1, wherein the first recirculation path includes a first inlet configured to receive the first plurality of rollers into the first recirculation path and a first outlet through which the first plurality of rollers are configured to exit the first recirculation path, and the second recirculation path includes a second inlet configured to receive the second plurality of rollers into the second recirculation path and a second outlet through which the second plurality of rollers are configured to exit the second recirculation path.

3. The ball screw assembly of claim 2, wherein the first inlet is defined by the first body channel and the first intermediate body channel, and the first outlet is defined by the first body channel and the first intermediate body channel.

4. The ball screw assembly of claim 3, wherein the second inlet is defined by the second body channel and the second intermediate body channel, and the second outlet is defined by the second body channel and the second intermediate body channel.

5. The ball screw assembly of claim 2, wherein the first inlet is aligned with the helical groove of the ball screw at a first point along the helical groove, the second outlet is aligned with the helical groove of the ball screw at a second point along the helical groove, and the first point is less than two helical revolutions from the second point along the helical groove.

6. The ball screw assembly of claim 1, wherein the second axial distance is greater than 85 percent of the first axial distance.

7. The ball screw assembly of claim 6, wherein the second axial distance is greater than 90 percent of the first axial distance.

8. The ball screw assembly of claim 1, wherein the external recirculation assembly extends circumferentially about the ball nut from a first circumferential end of the external recirculation assembly to a second circumferential end of the external recirculation assembly less than 270 degrees.

9. The ball screw assembly of claim 8, wherein the external recirculation assembly extends circumferentially about the ball nut from the first circumferential end of the external recirculation assembly to the second circumferential end of the external recirculation assembly about 180 degrees.

10. An external recirculation assembly for a ball screw assembly, comprising:

a first body that includes a first body channel;

a second body that includes a second body channel; and an intermediate body that includes a first intermediate body channel and a second intermediate body channel, wherein the intermediate body is positioned between the first body and the second body, such that the first body channel and the first intermediate body channel cooperate to define a first recirculation path, and the second body channel and the second intermediate body channel cooperate to define a second recirculation path, wherein the external recirculation assembly extends a first axial distance from a first axial endpoint of the external recirculation assembly formed by the first body to a second axial endpoint of the external recirculation assembly formed by the second body, and the intermediate body extends a second axial distance from a first axial endpoint of the intermediate body to a second axial endpoint of the intermediate body, wherein the first axial endpoint of the external recirculation assembly is the axially-outward most portion of the external recirculation assembly in a first axial direction, the second axial endpoint of the external recirculation assembly is the axially-outward most portion of the external recirculation assembly in a second axial direction opposite the first axial direction, the first axial endpoint of the intermediate body is the axially-outward most portion of the intermediate body in the first axial direction, and the second axial endpoint of the intermediate body is the axially-outward most portion of the intermediate body in the second axial direction, and wherein the second axial distance is greater than 75 percent of the first axial distance.

11. The external recirculation assembly of claim 10, wherein the first recirculation path includes a first inlet and a first outlet through, and the second recirculation path includes a second inlet and a second outlet, and wherein the first inlet is defined by the first body channel and the first intermediate body channel, and the first outlet is defined by the first body channel and the first intermediate body channel.

12. The external recirculation assembly of claim 11, wherein the second inlet is defined by the second body channel and the second intermediate body channel, and the second outlet is defined by the second body channel and the second intermediate body channel.

13. The external recirculation assembly of claim 10, wherein the second axial distance is greater than 85 percent of the first axial distance.

14. The external recirculation assembly of claim 13, wherein the second axial distance is greater than 90 percent of the first axial distance.

15. A ball screw assembly, comprising:

a ball screw;

a ball nut that cooperates with the ball screw to define a raceway; and an external recirculation assembly, comprising:

a first body that includes a first body channel;

a second body that includes a second body channel; and an intermediate body that includes a first intermediate body channel and a second intermediate body channel, wherein the first body channel and the first intermediate body channel cooperate to define a first recirculation path that is in fluid communication with the raceway, and the second body channel and the second intermediate body channel cooperate to define a second recirculation path that is in fluid communication with the raceway, wherein the external recirculation assembly extends a first axial distance from a first axial endpoint of the external recirculation assembly formed by the first body to a second axial endpoint of the external recirculation assembly formed by the second body, and the intermediate body extends a second axial distance from a first axial endpoint of the intermediate body to a second axial endpoint of the intermediate body, wherein the first axial endpoint of the external recirculation assembly is the axially-outward most portion of the external recirculation assembly in a first axial direction, the second axial endpoint of the external recirculation assembly is the axially-outward most portion of the external recirculation assembly in a second axial direction opposite the first axial direction, the first axial endpoint of the intermediate body is the axially-outward most portion of the intermediate body in the first axial direction, and the second axial endpoint of the intermediate body is the axially-outward most portion of the intermediate body in the second axial direction, and wherein the first axial distance is greater than the second axial distance.

16. The ball screw assembly of claim 15, wherein the raceway is helical.

17. The ball screw assembly of claim 15, wherein the ball screw is operable to rotate about an axis, and the ball nut is rotationally fixed relative to the axis.

18. The ball screw assembly of claim 17, comprising:

a first plurality of rollers; and a second plurality of rollers, wherein rotation of the ball screw about the axis drives circulation of the first plurality of rollers along a first roller path that includes the first recirculation path and the raceway, circulation of the second plurality of rollers along a second roller path that includes the second recirculation path and the raceway, and axial movement of the ball nut along the ball screw.

19. The ball screw assembly of claim 15, wherein the second axial distance is greater than 75 percent of the first axial distance.

* * * * *